(12) United States Patent
Barrett et al.

(10) Patent No.: US 8,731,352 B2
(45) Date of Patent: *May 20, 2014

(54) OPTICAL FIBER ASSEMBLIES

(71) Applicant: Corning Cable Systems LLC, Hickory, NC (US)

(72) Inventors: Louis Alexander Barrett, Conover, NC (US); Gerry Jay Harvey, Newton, NC (US); H. Edward Hudson, Conover, NC (US); Eric Raymond Logan, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/041,257

(22) Filed: Sep. 30, 2013

(65) Prior Publication Data
US 2014/0029905 A1    Jan. 30, 2014

Related U.S. Application Data

(63) Continuation of application No. 13/081,101, filed on Apr. 6, 2011, now Pat. No. 8,565,565, which is a continuation of application No. PCT/US2009/060163, filed on Oct. 9, 2009.

(60) Provisional application No. 61/104,142, filed on Oct. 9, 2008, provisional application No. 61/245,420, filed on Sep. 24, 2009.

(51) Int. Cl.
*G02B 6/44* (2006.01)

(52) U.S. Cl.
CPC .............. *G02B 6/441* (2013.01); *G02B 6/4401* (2013.01)
USPC .......................................... 385/100; 385/106

(58) Field of Classification Search
CPC ..... G02B 6/441; G02B 6/4411; G02B 6/4413
USPC .................................................. 385/100–114
See application file for complete search history.

(56) References Cited

U.S. PATENT DOCUMENTS 4,317,000 A    2/1982 Ferer ........................... 174/70 R
5,905,834 A    5/1999 Anderson et al. ............. 385/111

(Continued)

FOREIGN PATENT DOCUMENTS

| CN | 101248382 A | 8/2008 | ............... G02B 6/44 |
| EP | 983453 B1 | 11/2001 | ............. F16G 11/00 |
| EP | 1310814 A1 | 5/2003 | ............... G02B 6/44 |
| WO | WO 98/53222 | 11/1998 | ............. F16G 11/00 |

OTHER PUBLICATIONS

The Ancient Art of Laying Rope, Jakob Bohr and Kasper Olsen, Department of Physics, Technical University of Denmark, Aug. 8, 2010, 6 Pages.

(Continued)

*Primary Examiner* — Uyen Chau N Le
*Assistant Examiner* — Michael Mooney
(74) *Attorney, Agent, or Firm* — Russell S. Magaziner

(57) ABSTRACT

Fiber optic assemblies include subunit cables wrapped in binders. The assemblies have small cross sections and low bend radii while maintaining acceptable attenuation losses. SZ stranding of the subunit cables allows ease of access to the individual cables during installation.

20 Claims, 13 Drawing Sheets

(56) References Cited

U.S. PATENT DOCUMENTS

| | | | |
|---|---|---|---|
| 6,001,887 A | 12/1999 | Keup et al. | 516/118 |
| 6,049,648 A | 4/2000 | Stokes et al. | 385/111 |
| 6,321,012 B1 | 11/2001 | Shen | 385/106 |
| 6,377,736 B1 | 4/2002 | Murphy | 385/100 |
| 6,591,045 B2 | 7/2003 | Kawabata | 385/100 |
| 6,597,844 B1 | 7/2003 | Witt et al. | 385/109 |
| 7,200,307 B2 | 4/2007 | Bau' et al. | 385/111 |
| 7,221,831 B2 | 5/2007 | Keller et al. | 385/102 |
| 8,565,565 B2 * | 10/2013 | Barrett et al. | 385/114 |
| 2001/0055452 A1 | 12/2001 | Kawabata | 385/100 |
| 2003/0123822 A1 | 7/2003 | Witt et al. | 385/109 |
| 2005/0173148 A1 | 8/2005 | Shuman et al. | 174/113 |
| 2005/0286843 A1 | 12/2005 | Dallas et al. | 385/109 |
| 2006/0147164 A1 | 7/2006 | Bau et al. | 385/111 |
| 2006/0198585 A1 | 9/2006 | Keller et al. | 385/107 |
| 2006/0280413 A1 | 12/2006 | Paschal et al. | 385/112 |
| 2012/0243841 A1 | 9/2012 | Hurley et al. | 385/113 |
| 2012/0281955 A1 | 11/2012 | Hudson et al. | 385/103 |

OTHER PUBLICATIONS

General Cable, SmartWrap™ Bundled Cable sheet, p. 165, printed from the internet on or about Dec. 29, 2011.
Chinese Search Report, May 24, 2013, 2 pages.
Chinese Office Action, May 30, 2013, 7 pages.
Patent Cooperation Treaty, International Preliminary Report on Patentability, Apr. 21, 2011, 9 pages.

* cited by examiner

OPTICAL FIBER ASSEMBLIES

PRIORITY APPLICATION

This application is a continuation of U.S. application Ser. No. 13/081,101, filed Apr. 6, 2011, which is a continuation of International Application No. PCT/US2009/060163, filed Oct. 9, 2009, which claims priority to U.S. Application No. 61/104,142, filed Oct. 9, 2008, and to U.S. Application No. 61/245,420, filed Sep. 24, 2009, the contents of each of the four of which are incorporated by reference herein in their entirety.

TECHNICAL FIELD

The present application relates generally optical fiber assemblies having low bend radii and small cross-sectional areas.

BACKGROUND

Communications networks are used to transport a variety of signals such as voice, video, data and the like. As communications applications required greater bandwidth, communication networks switched to fiber optic cables since they are capable of transmitting an extremely large amount of bandwidth compared with copper conductors. Fiber optic cables are also much smaller and lighter compared with copper cables having the same bandwidth capacity. Conventional fiber optic cables, however, may be too large or rigid for some applications. For example, in a multiple dwelling unit (MDU) such as an apartment building, it is often necessary to run fiber optic cables through small spaces and around tight corners to provide access to individual dwelling units. Conventional fiber optic cables often are either too large in cross-section, too inflexible, or both, to be run to individual dwelling units.

Conventional MDU deployments also require pulling individual cables from the fiber distribution terminal (FDT) to each living unit. The technician typically unspools a cable down a hallway and then places them into a raceway molding. The raceway can become congested with cables, however, and the technician may be required to pull from 6-12 individual drop cables from the FDT to the living units. The time required to pull off of individual reels can also be disruptive to MDU tenants and add to labor costs of installation.

SUMMARY

According to one embodiment, a fiber optic assembly comprises a bundled unit of a plurality of single fiber subunit fiber optic cables stranded together. The bundle of subunit fiber optic cables may be wrapped with one or more binders to secure the subunit cables in place. The subunit cables can be SZ stranded to facilitate access to individual subunits. The subunit cables can have flame retardant properties to achieve desired flame ratings for the fiber optic assembly.

According to one aspect of the first embodiment, the stranded bundle of subunit fiber optic cables forming the fiber optic assembly does not require a conventional central strength member component, such as a GRP rod, or an outside cable sheath. Omission of the central strength component and/or outer jacket in part gives the fiber optic assembly an extremely small bending radius and a small cross-section.

According to another aspect, one or more of the subunit fiber optic cables can have an integral, individual strength component. The strength component can comprise a layer of flexible, loose tensile strength members. Accordingly, the fiber optic assembly incorporating the subunit cables can have extremely high tensile strength, while not being excessively rigid or inflexible such as cables having rigid central strength members.

According to yet another aspect, the subunit fiber optic cables can include one or more bend-insensitive optical fibers. The fiber optic assembly can therefore be bent around tight corners, etc. without excessive attenuation losses in the individual optical fibers. In use, the subunit fiber optic cables can be separated from the fiber optical assembly and run to separate locations. The use of bend-insensitive optical fibers allows the subunit cables to be run through extremely tight locations and along tortuous paths.

Those skilled in the art will appreciate the above stated advantages and other advantages and benefits of various additional embodiments reading the following detailed description of the embodiments with reference to the below-listed drawing figures.

BRIEF DESCRIPTION OF THE DRAWINGS

The various features of the drawings are not necessarily drawn to scale.

DETAILED DESCRIPTION

Figure 1:
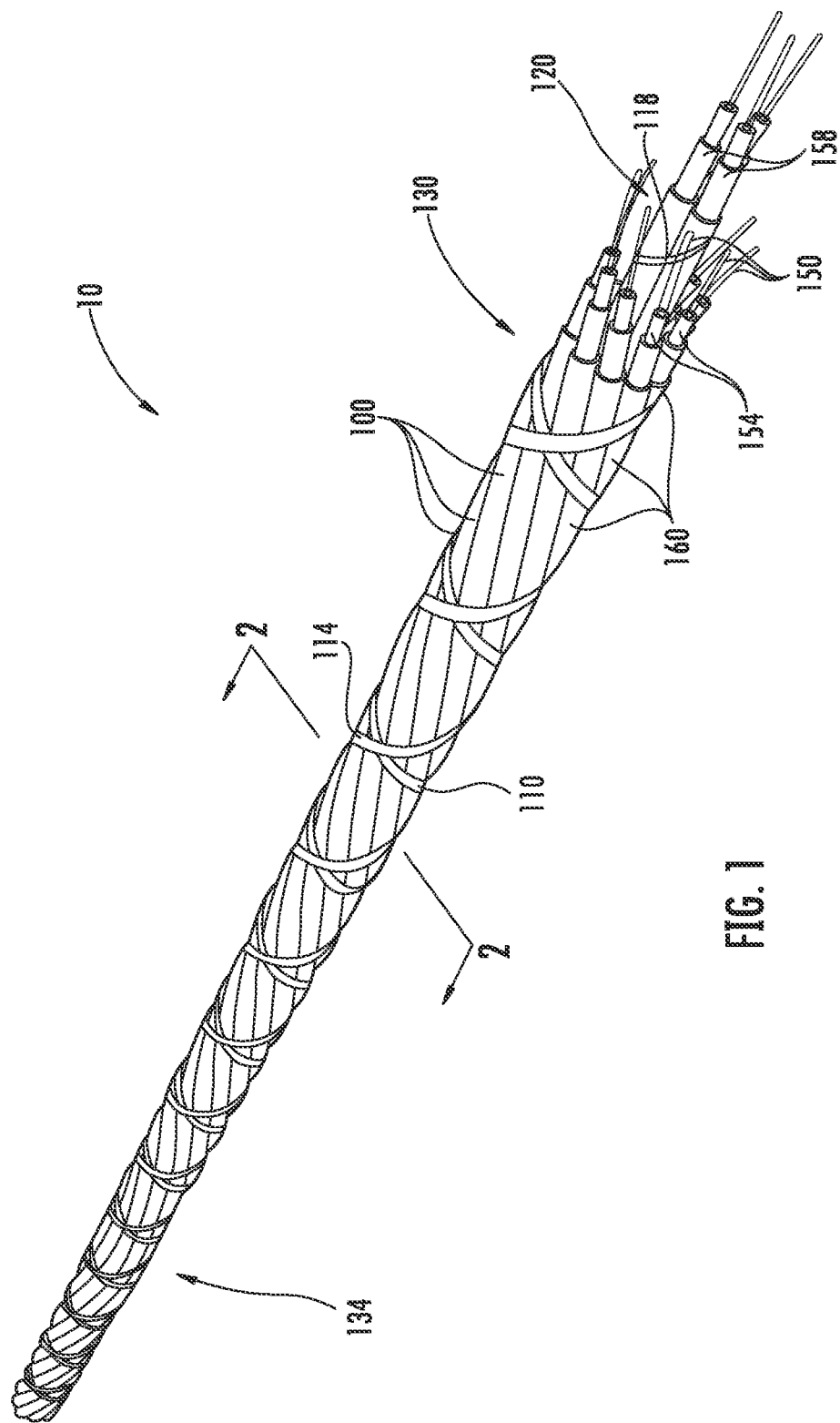
FIG. 1 is a perspective view of a portion of a fiber optic assembly according to a first embodiment of the invention.

Reference will now be made in detail to the present embodiments, examples of which are illustrated in the accompanying drawings. Whenever possible, the same reference numerals will be used throughout the drawings to refer to the same or like parts.

Figure 2:
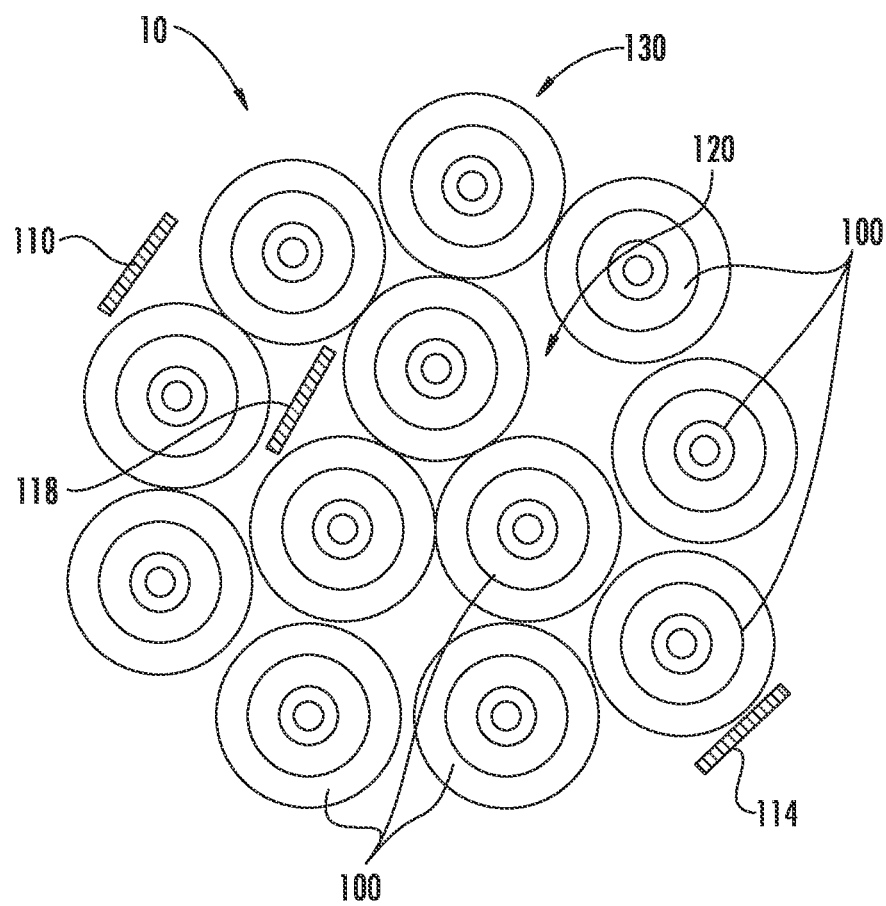
FIG. 2 is a cross-sectional view of the fiber optic assembly illustrated in FIG. 1 taken on line 2-2 in FIG. 1.

FIG. 1 is a perspective view of a portion of a fiber optic assembly 10 or bundled optical cable according to a first embodiment of the invention. FIG. 2 is a cross-sectional view of the fiber optic assembly 10 taken on line 2-2 in FIG. 1. Referring to FIGS. 1 and 2, the fiber optic assembly 10 comprises a bundled unit of a plurality of subunit fiber optic cables 100. The subunit cables 100 are wrapped with one or more binders to secure the subunit cables 100 in place. In the illustrated embodiment, a pair of oppositely helically wound outer or external binders 110, 114 are wound about the external periphery of the bundle of subunit cables 100. One or more inner binders can be helically wound about an inner layer 120 of the subunit cables 100. In the illustrated embodiment, a single inner binder 118 is wound about the three inner subunit cables 100 that constitute an inner layer 120 of subunit cables. The outer layer 130 of subunit cables 100 is constituted by the nine subunit cables surrounding the inner layer 120 in a "9-3" arrangement.

In the illustrated embodiment, the subunit cables 100 are SZ stranded together. SZ stranding is advantageous in that it facilitates mid-span access of the subunit cables 100, and important feature when the cables 100 are to be deployed throughout structures such as multiple dwelling units. The outer binders 110, 114 may be contra-helically stranded about the outer layer 130 of subunit cables 100, and the inner binder 118 may be helically wrapped about the inner layer 120. In general, the lay length of the helically wrapped external binders 110, 114 is smaller than the lay length of the subunit cables 100, but other suitable lay lengths are possible. The adjoining inner and outer layers 120, 130 of subunit cables 100 can be stranded in separate passes on separate stranders, or on a common strander in a single pass. The subunit cables 100 of the inner layer 120 may be immediately adjacent and contacting those of the outer layer 130, with only the binder 110 being interposed between the layers.

The binders 110, 114, 118 stranded about the subunit fiber optic cables 100 can be made from high tensile strength materials to enhance the tensile strength of the fiber optic assembly 10. For example, the binders can be formed from elongate tensile yarns, such as aramid, fiberglass, polyester and other tensile yarns.

Figure 3:
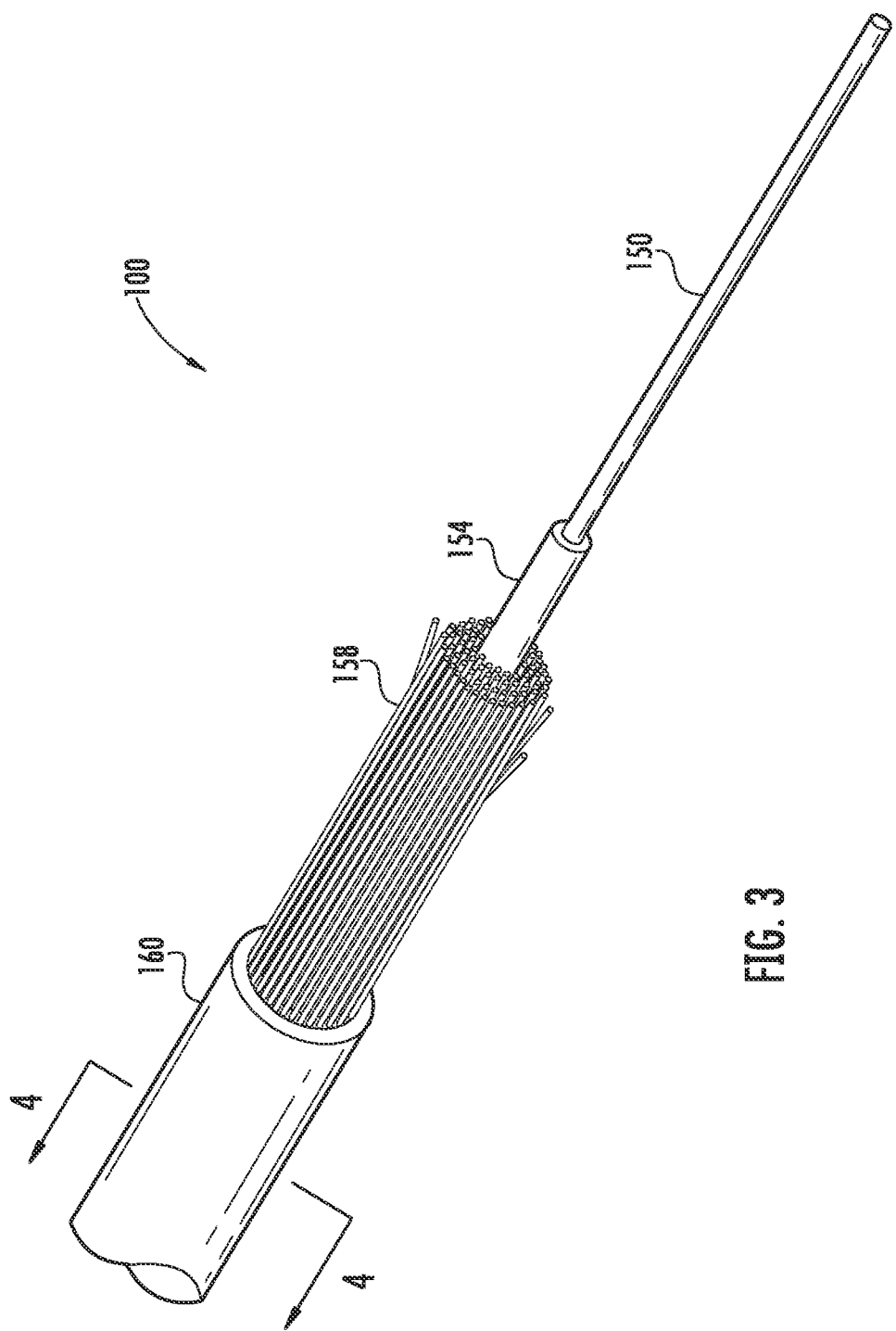
FIG. 3 is a perspective partial cutaway view of a portion of a subunit fiber optic cable used in the fiber optic assembly illustrated in FIG. 1.
Figure 4:
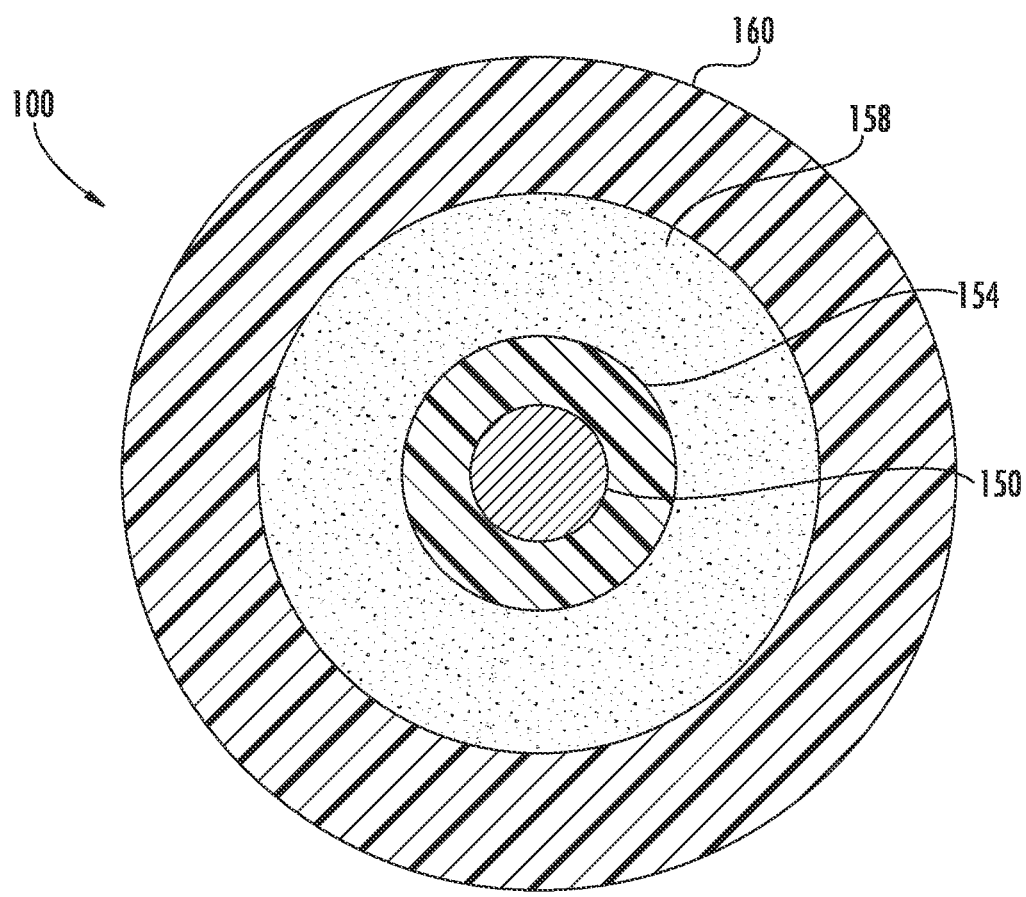
FIG. 4 is a cross-sectional view of the subunit fiber optic cable illustrated in FIG. 3 taken on line 4-4 in FIG. 3.

FIG. 3 is a perspective partial cutaway view of a portion of a subunit fiber optic cable 100 used in the fiber optic assembly 10 shown in FIG. 1. FIG. 4 is a cross-sectional view of the subunit fiber optic cable 100 taken on line 4-4 in FIG. 3. The subunit fiber optic cables 100 can be, for example, flame retardant single fiber cables. In the illustrated embodiment, the subunit fiber optic cable 100 includes a single optical fiber 150 surrounded by a buffer coating 154 applied over the optical fiber 150. The optical fiber 150 may contain a core and a cladding surrounding the core, with one or more polymer coatings applied over the cladding. A layer 158 of loose tensile strength members surrounds the buffer coating 154, and an outer polymer tubular subunit jacket or sheath 160 is extruded over the layer 158 of strength members. According to the present embodiments, the layer 158 of loose tensile strength members adds sufficient tensile strength to the individual fiber optic subunits such that additional strength members are not required for the overall assembly 10. For example, assemblies as disclosed herein can be free of rigid strength members such as glass-reinforced plastic (GRP) rods, which add cost and increase the bend radii of cables.

The buffer coating 154 may be formed of a polyvinyl chloride (PVC) material. Other suitable materials for the coating 154 include polymeric materials such as ultraviolet light cured acrylate materials, polyethylene, PVDF, nylon or PVR. The outer subunit jacket 160 may be formed of PVC material, for example. Other suitable materials for the outer subunit jacket 160 include polymeric materials such as polyethylene, PVDF, or nylon. The layer 158 of tensile strength members can be aramid fiber yarns such as KEVLAR® available from E.I. du Pont de Nemours and Co., fiberglass, and aramid-reinforced plastics (ARP). The subunit jacket 160 and/or the coating 154 can include aluminum trihydrate, antimony trioxide, or other suitable additives to improve flame resistance.

The optical fibers 150 used in the subunit fiber optic cables 100 may be bend-insensitive optical fibers. Examples of bend-insensitive optical fibers include the ClearCurve™ brand of optical fibers available from Corning Incorporated. Such fibers may have bend radii as low as 5 mm with low attenuation.

Figure 5:
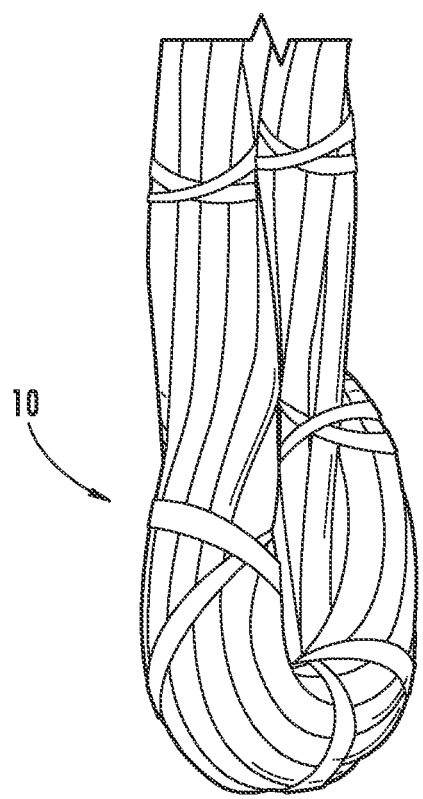
FIG. 5 illustrates bend characteristics of the fiber optic assembly illustrated in FIG. 1.
Figure 6:
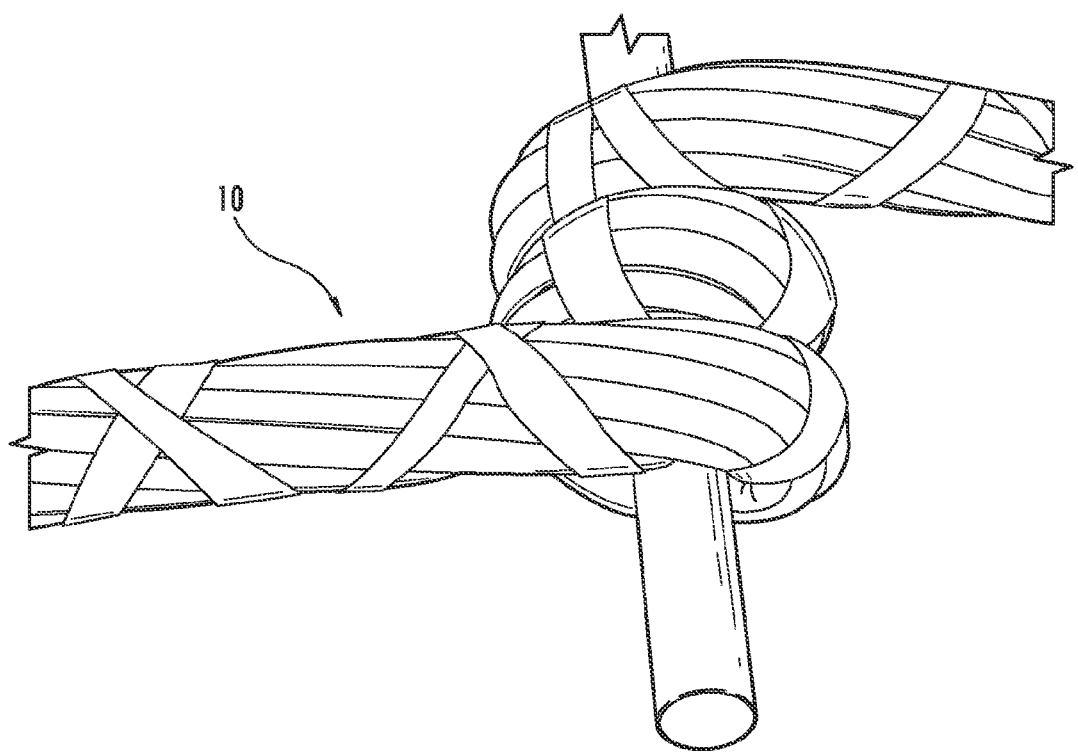
FIG. 6 is another depiction of bend characteristics of the fiber optic assembly illustrated in FIG. 1.

The fiber optic assembly 10 can have a very small bend diameter while maintaining acceptable attenuation losses. FIG. 5 illustrates the ability of the fiber optic assembly 10 to be essentially folded back on itself without undue effort. The bend insensitive fibers used in the subunit fiber optic cables 100 can bend at radii of 5 mm, so there is no excess attenuation in the fiber optic assembly 10 in tight bends. FIG. 6 illustrates winding of the fiber optic assembly 10 around a small-diameter mandrel. The illustrated mandrel has a diameter of about ⅛ inch (3.2 mm) With the extremely tight possible bend configurations of the fiber optic assembly 10, the assembly is essentially self-limiting in bend characteristics. In other words, the technician installing the fiber optic assembly 10 will not likely be capable of bending the fiber optic assembly in such a way as to induce unacceptable attenuation, and the tightness of the bend diameter is instead determined by the structure of the fiber optic assembly. As used herein, the "bend diameter" induced in a cable or fiber optic assembly can be obtained by wrapping the cable or fiber optic assembly about an elongate element of circular cross-section. The diameter of the elongate element is the bend diameter.

Figure 7:
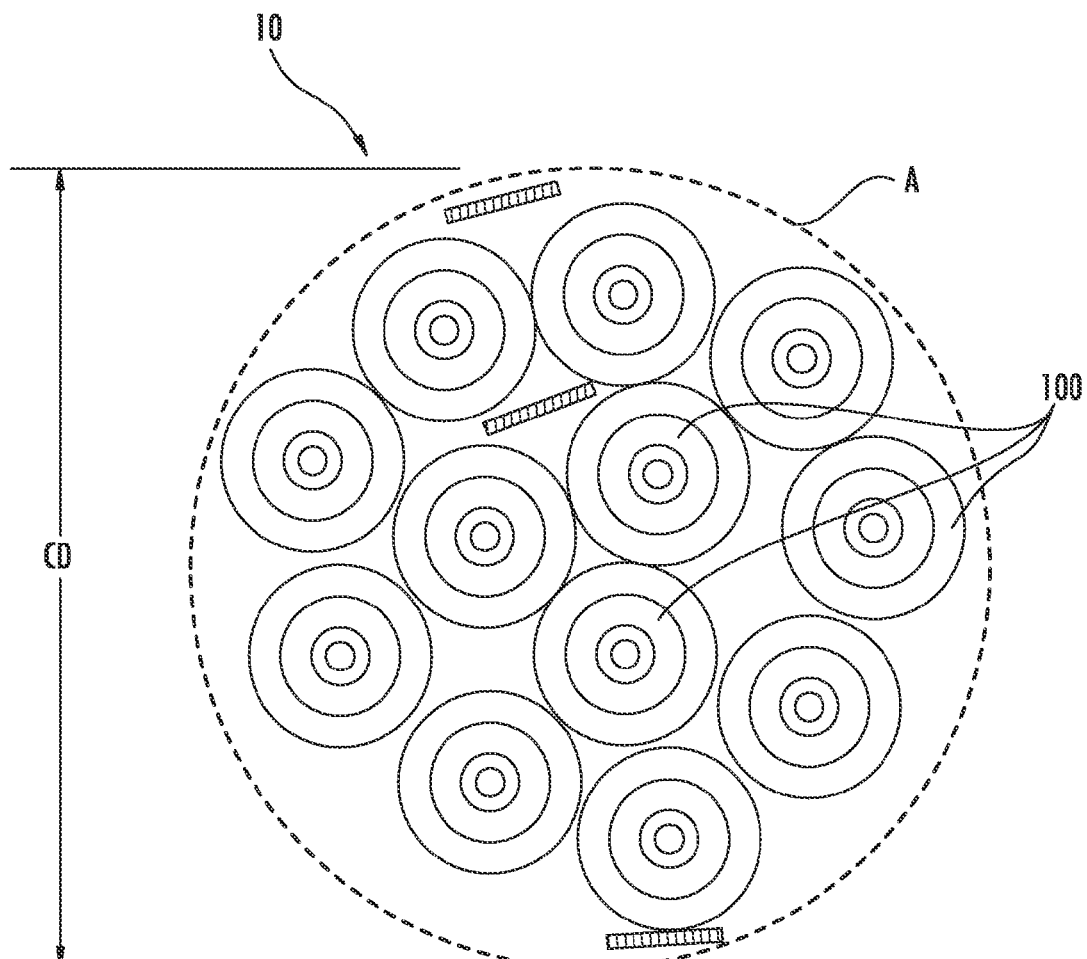
FIG. 7 is a depiction of characteristic dimensions for the fiber optic assembly illustrated in FIG. 1.

FIG. 7 illustrates characteristic dimensions for the fiber optic assembly 10. In FIG. 7, the fiber optic assembly 10 is illustrated as having an idealized cross-sectional area A which is defined by a circle (shown in dashed lines) that encompasses the fiber optic assembly 10, and a cable diameter CD. The cable diameter CD generally will not be uniform across different parts for the cable cross-section, and may also vary slightly along the length of the fiber optic assembly 10. An average or mean cable diameter may be measured, for example, by taking several width or thickness measurements along the fiber optic assembly using a micrometer. The absence of a central strength member (e.g. GRP rod) and outer jacket means the fiber optic assembly 10 has a relatively small cross-sectional area A and cable diameter CD when compared with similar cables having an equivalent fiber count. According to the present embodiments, the bundled unit size of the fiber optic assembly 10 is substantially smaller than, for example, a comparable 12-fiber fan out cable assembly. For example, the fiber optic assembly 10 having twelve subunit fiber optic cables 100 may have a cable diameter CD of about 12.5 mm or less. In another embodiment, the cable diameter CD may be about 11.5 mm or less. By contrast, a comparable conventional riser fan out cable has an average cable diameter of about 13.5 mm. Keeping the size less than 12.7 mm (½ inch) ensures that the fiber optic assembly 10 can be routed through a short section of ½ inch conduit.

The fiber optic assembly 10 can be adapted for indoor use, for example, such that an outside cable sheath for the fiber optic assembly is unnecessary. The absence of an outer jacket, as well as omitting a central strength member, in part provides the fiber optic assembly 10 with its relatively low bend diameter. By contrast, in conventional cables, maximum allowable strains on the outer surface of the cable jacket limit the cable bending radius to at least about 5 to 10 times the outer cable diameter. Each subunit cable 100 may be provided with a flexible strength component, such as the layer 158, so that the fiber optic assembly 10 has sufficient tensile strength while remaining flexible.

According to one embodiment of the invention, the bend diameter of the fiber optic assembly 10 having twelve subunit fiber optic cables 100 is less than two inches (50.8 mm) and the tensile strength is at least 100 lbs. According to another embodiment, the bend diameter is less than one inch (25.4 mm), and the tensile strength is at least 200 lbs. According to yet another embodiment, the bend diameter is less than 0.5 inch, and the tensile strength is at least 300 lbs. As shown in FIG. 5, the fiber optic assembly 10 can be folded back on itself.

According to one embodiment of the invention, the tensile limit for allowable strain on the optical fibers in the fiber optic assembly 10 having twelve subunit fiber optic cables 100 is at least 200 lbs., with the tensile limit for each subunit fiber optic cable 100 being at least 30 lbs. According to another embodiment of the invention, the tensile limit for the fiber optic assembly 10 is at least 300 lbs., with each subunit fiber optic cable 100 having a tensile limit of at least 40 lbs. According to another embodiment of the invention, the tensile limit for the fiber optic assembly 10 is in the range of 300 lbs to 600 lbs, with each subunit fiber optic cable 100 having a tensile limit of at least 50 lbs.

Example 1

A fiber optic assembly 10 as illustrated in FIGS. 1-2 is formed from twelve flame retardant fiber optic subunit cables 100. The subunit cables 100 are single fiber cables SZ stranded together. The fiber optic assembly 10 has a minimum bend such that it can be folded back on itself (FIG. 5) and a tensile strength of at least 300 lbs. A pair of outer binders 110, 114 made from polyester are contra-helically stranded about the outer layer 130 of nine subunit cables 100. An inner binder 118 is helically wound about an inner layer 120 of three inner subunit cables 100. Each subunit cable 100 has a diameter of 2.9 mm. The cable diameter CD is 11.1 mm. The fiber optic assembly 10 has no outer jacket or central strength member. The tensile rating for each subunit fiber optic cable is 50 lbs. The fiber proof stress of the inner three subunit cables 100 is 200 kpsi, and the fiber proof stress for the outer nine subunit cables 100 is 100 kpsi. The higher fiber proof stresses for the inner subunit cables 100 accommodates the higher level of axial strain of the inner subunit cables as compared with the outer subunit cables 100.

One relevant test limit for tensile performance requires the short term fiber strain to be less than 60% of the fiber proof test. Varying the proof test between the inner and outer layers ensures that all twelve fibers will reach their 60% proof test limit at approximately the same time resulting in a high tensile strength rating in the range of 300 to 600 lbs.

According to the above-described embodiments, the low bend diameter and small cross-sectional area in part allow the fiber optic assembly 10 to be bent around corners and otherwise introduced into tight spaces or through apertures, while maintaining acceptable attenuation loss performance. The fiber optic assembly 10 is therefore particularly suited for providing fiber optic service indoors to structures such as multiple dwelling units (MDU). In one method of installation, the fiber optic assembly 10 could be placed in a corner molding raceway and single fiber subunit cables 100 can be dropped at each apartment of a MDU. While the subunit cables 100 can be stranded in various ways, SZ stranding provides ease of access at midspan locations of the assembly 10.

Figure 8:
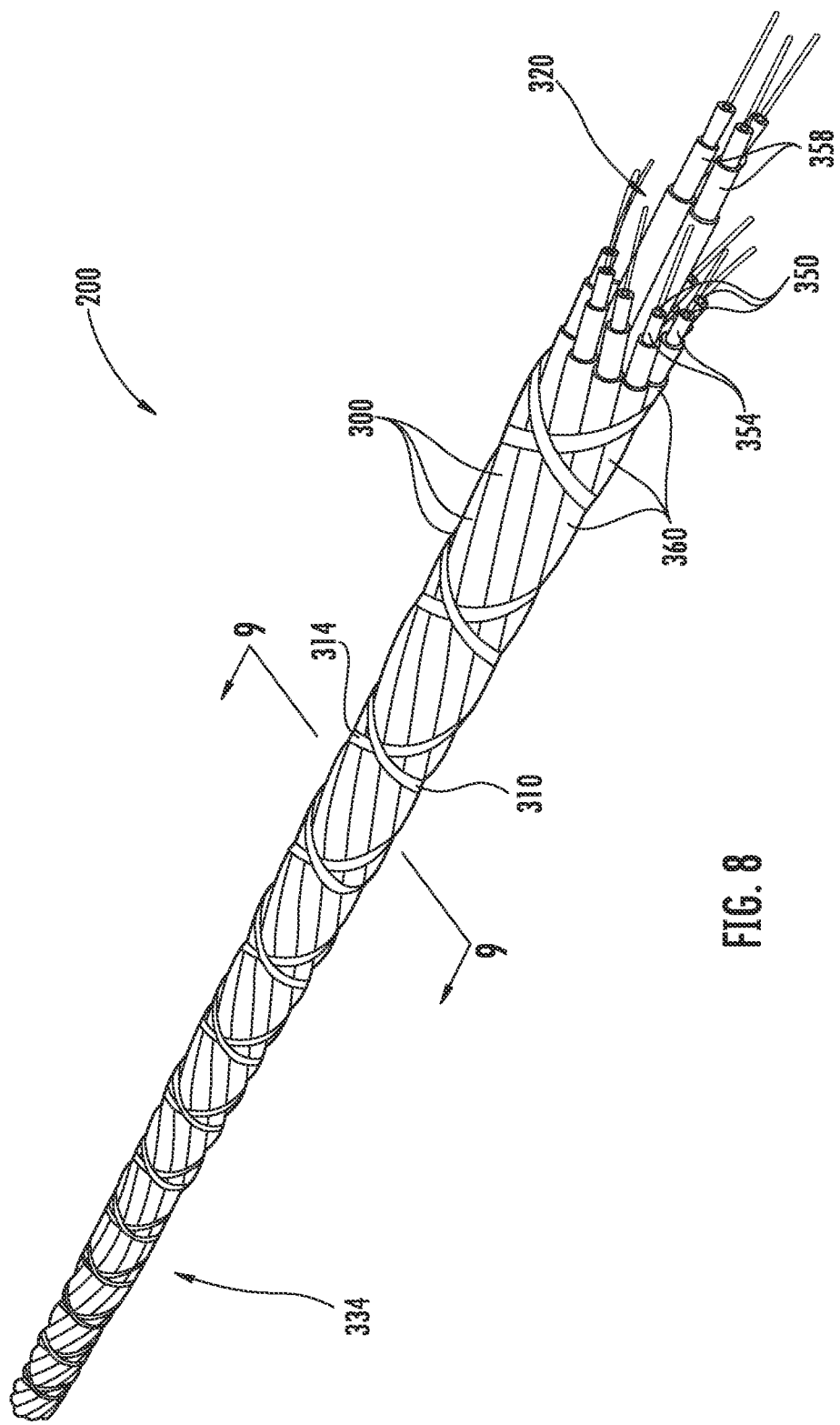
FIG. 8 is a perspective view of a portion of a fiber optic assembly according to a second embodiment of the invention.
Figure 9:
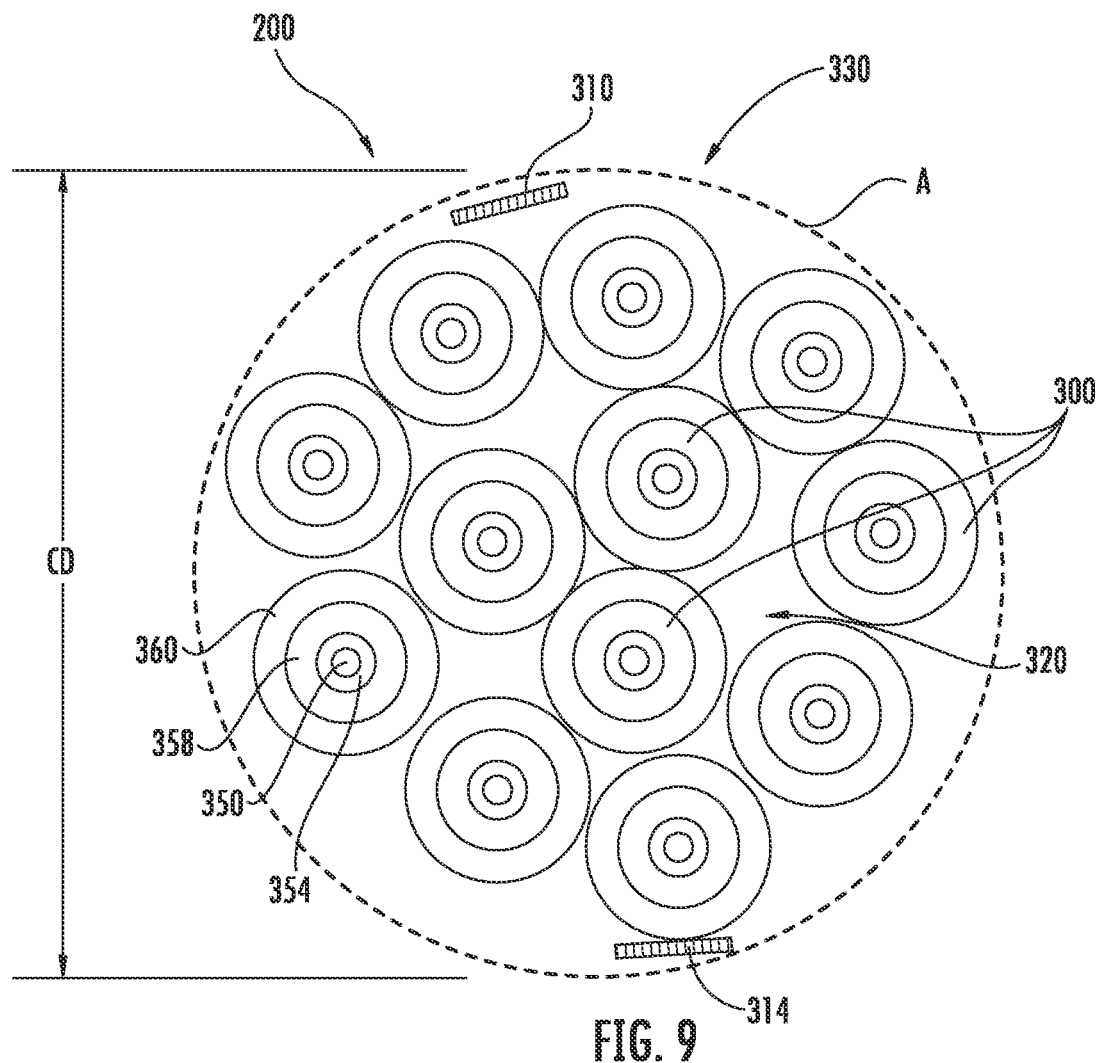
FIG. 9 is a cross-sectional view of the fiber optic assembly illustrated in FIG. 8 taken on line 9-9 in FIG. 8.

FIG. 8 is a perspective view of a portion of a fiber optic assembly 200 or bundled optical cable according to a second embodiment of the invention. FIG. 9 is a cross-sectional view of the fiber optic assembly 200 taken on line 9-9 in FIG. 8. The arrangement of the assembly 200 can be generally similar to the cable 10 shown in FIGS. 1 and 2. As in the cable 10, the fiber optic assembly 200 comprises an inner layer 320 of three subunit fiber optic cables 300 surrounded by an outer layer 330 of nine cables 300. A pair of oppositely helically wound outer or external binders 310, 314 are wound about the external periphery of the bundle of subunit cables 300. The assembly 200 does not, however, include an inner binder around the inner layer 320.

In the illustrated embodiment, the subunit cables 300 are SZ stranded together, with a reversal point generally indicated at 334. The outer binders 310, 314 may be contra-helically stranded about the outer layer 330 of subunit cables 300. In general, the lay length of the helically wrapped external binders 310, 314 is smaller than the lay length of the subunit cables 300, but other suitable lay lengths are possible. The adjoining inner and outer layers 320, 330 of subunit cables 300 can be stranded in separate passes on separate stranders or on a common strander in a single pass. The binders 310, 314 can be made from, for example, high strength materials formed from tensile yarns, such as aramid, fiberglass, polyester and other tensile yarns. The subunit fiber optic cables 300 used in the fiber optic assembly 200 can be similar to the subunit cables 100 shown in FIG. 1. The subunit cables 200, however, may have a smaller outside diameter, such as, for example, 2.0 mm, or 1.65 mm.

The subunit fiber optic cables 200 can be, for example, flame retardant single fiber cables. In the illustrated embodiment, the subunit fiber optic cables 300 include a single optical fiber 350 surrounded by a buffer coating 354 applied over the optical fiber 350. The optical fiber 350 may contain a core and a cladding surrounding the core, with one or more polymer coatings applied over the cladding. A layer 358 of loose tensile strength members surrounds the buffer coating 354, and an outer polymer tubular subunit jacket or sheath 360 is extruded over the layer 358 of strength members. The buffer coating 354 and layer 358 may be formed of materials as discussed above regarding the buffer coating 154 and layer 158, respectively. The optical fibers 350 used in the subunit fiber optic cables 300 may be bend-insensitive optical fibers such as the ClearCurve™ brand of optical fibers available from Corning Incorporated. The subunit cables 200 of the inner layer 320 may be immediately adjacent and contacting those of the outer layer 330, with no element being interposed between the layers.

The fiber optic assembly 200 having twelve subunit fiber optic cables 300 may have a cable diameter CD, approximated as discussed above for the cable 10, of about 10 mm or less. In another embodiment, the cable diameter CD may be about 8 mm or less. Small assembly diameter ensures that the fiber optic assembly 200 can be routed through a short section of ½ inch (12.7 mm) conduit. As in the case of the cable 10, no outside cable sheath or central strength member is required, which in part provides the fiber optic assembly 200 with its relatively low bend diameter D. The layers 358 provide tensile strength to each subunit 300 of at least 120 Newtons maximum short-term tensile load. According to one embodiment, for a subunit outside diameter of 1.65 mm, maximum short-term tensile load is at least 150 Newtons.

Example 2

A fiber optic assembly 200 as illustrated in FIGS. 8 and 9 is formed from twelve flame retardant fiber optic subunit cables 300. The subunit cables 300 are single fiber cables SZ stranded together and having ClearCurve™ single mode bend insensitive fibers. A pair of outer binders 310, 314 made from polyester are contra-helically stranded about the outer layer 330 of nine subunit cables 300. Each subunit cable 300 has an outside diameter of 1.65 mm. The average cable diameter CD is about 6 mm. The fiber optic assembly 200 has no outer jacket or central strength member. The maximum short-term tensile load for each subunit fiber optic cable 300 is 150 Newtons.

Figure 10:
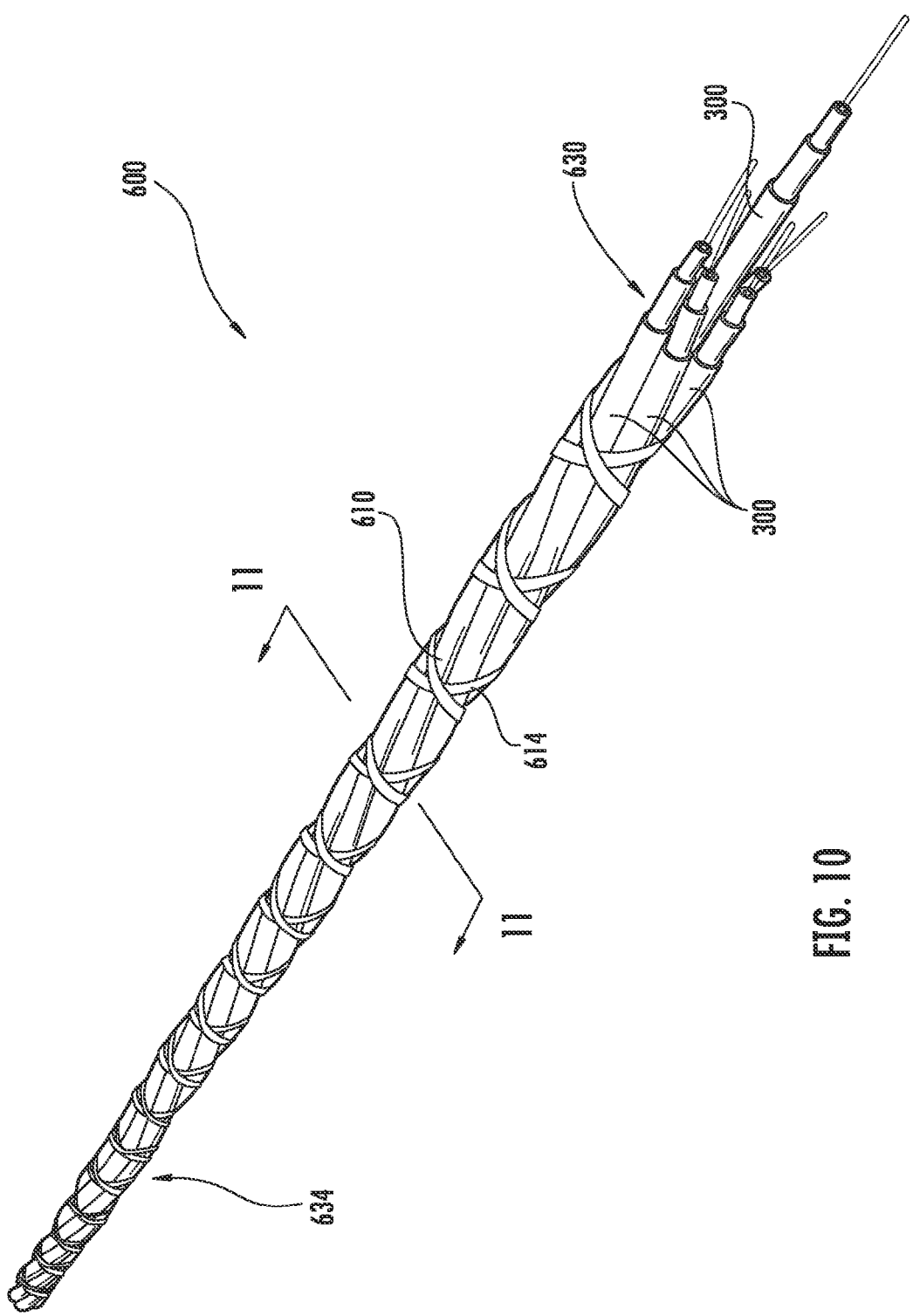
FIG. 10 is a perspective view of a portion of a fiber optic assembly according to a third embodiment of the invention.
Figure 11:
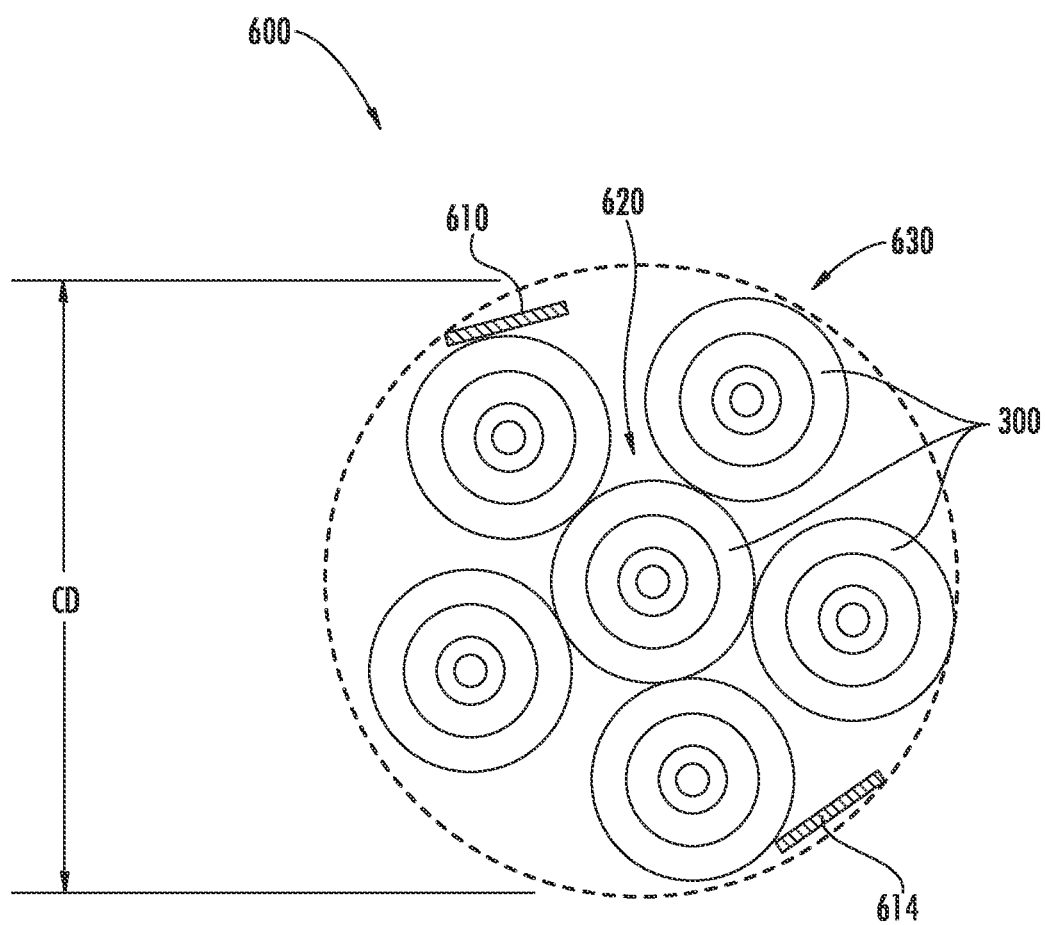
FIG. 11 is a cross-sectional view of the fiber optic assembly illustrated in FIG. 10 taken on line 11-11 in FIG. 10.

FIG. 10 is a perspective view of a portion of a fiber optic assembly 600 or bundled optical cable according to a third embodiment of the invention. FIG. 11 is a cross-sectional view of the fiber optic assembly 600 taken on line 11-11 in FIG. 10. The fiber optic assembly 600 comprises an inner layer 620 of one subunit fiber optic cable 300 surrounded by an outer layer 630 of five cables 300. A pair of oppositely helically wound outer or external binders 610, 614 are wound about the external periphery of the bundle of subunit cables 600. In the illustrated embodiment, the subunit cables 300 are SZ stranded together, with a reversal point generally indicated at 634. The outer binders 610, 614 may be contra-helically stranded about the outer layer 630 of subunit cables 300. In general, the lay length of the helically wrapped external binders 610, 614 is smaller than the lay length of the subunit cables 300. The exemplary 1.65 mm outside diameter subunit cables 300 are suitable for use in any of the embodiments described in this specification.

The fiber optic assembly 600 having six subunit fiber optic cables 300 may have a cable diameter CD, approximated as discussed above for the cable 10, of about 6.5 mm or less. In another embodiment, the cable diameter CD may be about 5.5 mm or less. Keeping the size low ensures that the fiber optic assembly 600 can be easily routed through a short section of ½ inch (12.7 mm) conduit.

Figure 12:
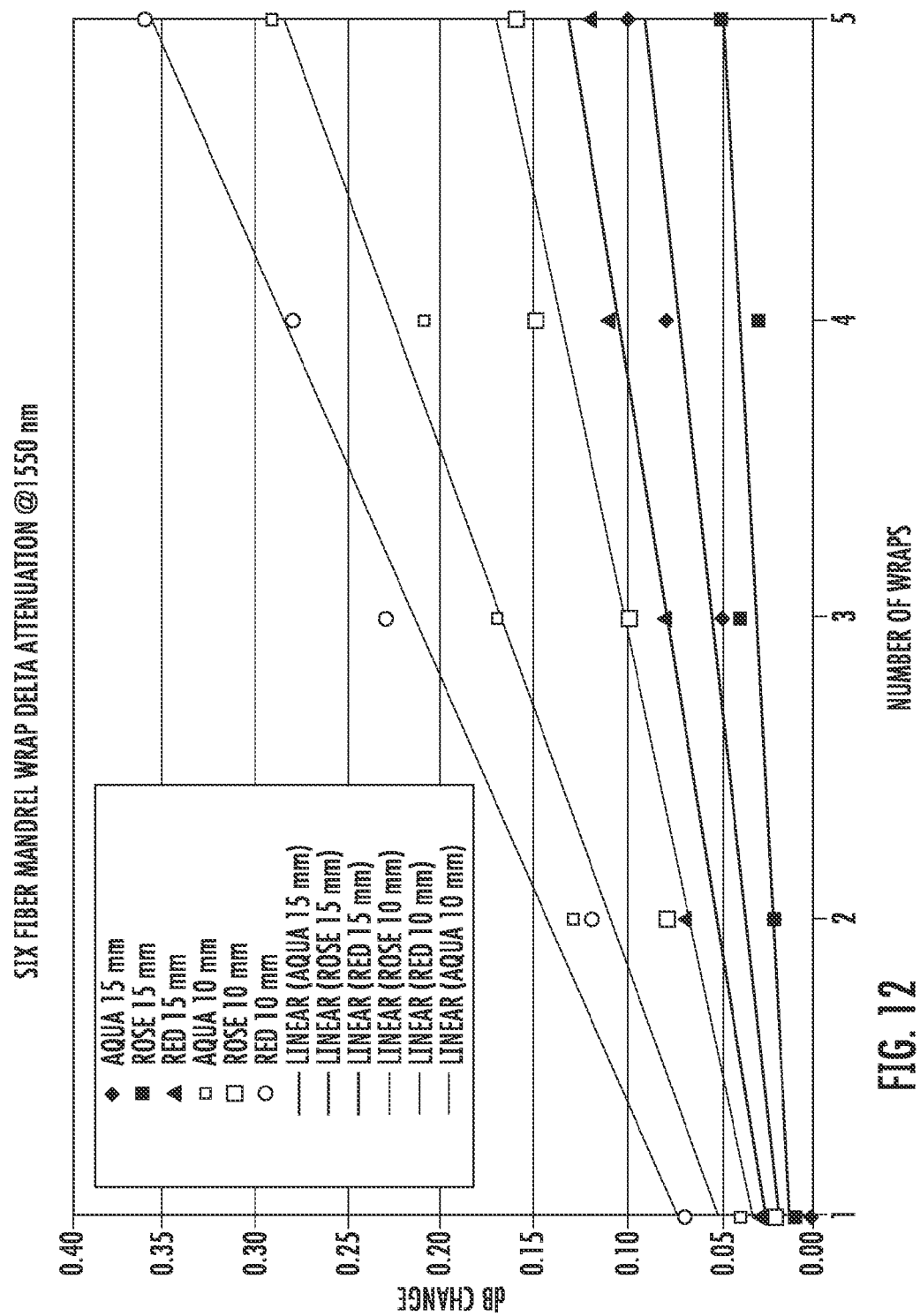
FIG. 12 is a plot of delta attenuation in a mandrel wrap test at 1550 nanometers for the cable of FIGS. 10-11.
Figure 13:
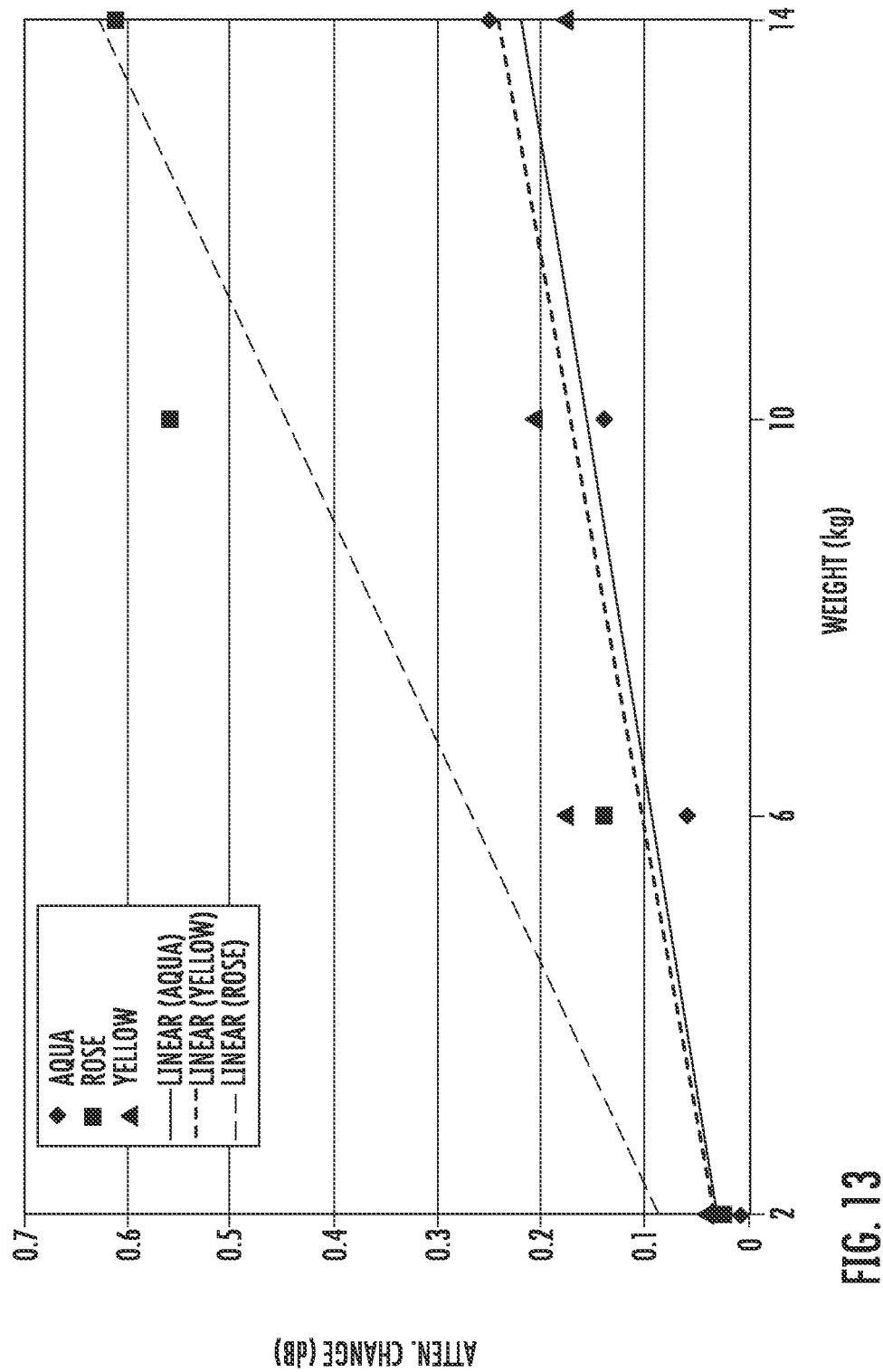
FIG. 13 is a plot of delta attenuation in a corner bend test at 1550 nanometers for the cable of FIGS. 10-11.

The fiber optic assembly 600 can have a very small bend diameter while maintaining acceptable attenuation losses. FIG. 12 is a plot of delta attenuation for fibers in selected subunit cables 300 when subjected to a mandrel wrap test at a wavelength of 1550 nm. The mandrel sizes were 10 mm and 15 mm. FIG. 13 is a plot of delta attenuation for fibers in selected subunit cables 300 when subjected to a corner bend test under various loads at a wavelength of 1550 nm.

Example 3

A fiber optic assembly 600 as illustrated in FIGS. 10 and 11 is formed from six flame retardant fiber optic subunit cables 300. The subunit cables 300 are single fiber cables SZ stranded together and having ClearCurve™ single mode bend insensitive fibers. A pair of outer binders 610, 614 made from polyester are contra-helically stranded about the outer layer 630 of nine subunit cables 300. Each subunit cable 300 has a diameter of 1.65 mm. The cable diameter CD is 4.8 mm. The fiber optic assembly 600 has no outer jacket or central strength member. The maximum short-term tensile load for each subunit fiber optic cable 300 is 150 Newtons.

Table 1 describes attenuation data for the cable assembly 600 of FIG. 10, using ClearCurve™ single mode fiber in the subunit cables 300, in a mandrel wrap test using a 15 mm diameter mandrel with varying numbers of wraps, at a wavelength of 1550 nanometers.

TABLE 1

15 mm Mandrel Wrap Delta Attenuation at 1550 nanometers

| Color | Wrap # | delta attenuation (dB) |
|---|---|---|
| Aqua | 1 | 0.00 |
| Aqua | 2 | 0.02 |
| Aqua | 3 | 0.05 |
| Aqua | 4 | 0.08 |
| Aqua | 5 | 0.10 |
| Rose | 1 | 0.01 |
| Rose | 2 | 0.02 |
| Rose | 3 | 0.04 |
| Rose | 4 | 0.03 |
| Rose | 5 | 0.05 |
| Red | 1 | 0.03 |
| Red | 2 | 0.07 |
| Red | 3 | 0.08 |
| Red | 4 | 0.11 |
| Red | 5 | 0.12 |

As shown in Table 1, each of the three tested fibers in the subunits of the cable assembly 600 experience an absolute delta attenuation value of less than 0.2 dB at 1550 nm under up to five wraps about the 15 mm mandrel. Each of the three tested fibers experience a delta attenuation of less than 0.2 dB under up to three wraps about the 15 mm mandrel. Each of the three tested fibers experience a delta attenuation of less than 0.15 dB under up to four wraps about the 15 mm mandrel. Each of the three tested fibers experience a delta attenuation of less than 0.10 dB under up to two wraps about the 15 mm mandrel. Each of the three tested fibers experience a delta attenuation of less than 0.05 dB under up to one wrap about the 15 mm mandrel.

Table 2 describe attenuation data for cable assembly 600 if FIG. 11 using ClearCurve™ single mode bend insensitive fiber in the subunit cables 300, in a mandrel wrap test using a 10 mm diameter mandrel, under varying numbers of wraps, at a wavelength of 1550 nanometers.

TABLE 2

10 mm Mandrel Wrap Delta Attenuation at 1550 nanometers

| Color | Wrap # | delta attenuation (dB) |
|---|---|---|
| Aqua | 1 | 0.04 |
| Aqua | 2 | 0.13 |
| Aqua | 3 | 0.17 |
| Aqua | 4 | 0.21 |
| Aqua | 5 | 0.29 |
| Rose | 1 | 0.02 |
| Rose | 2 | 0.08 |
| Rose | 3 | 0.10 |
| Rose | 4 | 0.15 |
| Rose | 5 | 0.16 |
| Red | 1 | 0.07 |
| Red | 2 | 0.12 |
| Red | 3 | 0.23 |
| Red | 4 | 0.28 |
| Red | 5 | 0.36 |

As shown in Table 2, each of the three tested fibers of the cable assembly 600 experience an absolute delta attenuation value of less than 0.5 db at 1550 nm under up to five wraps about the 10 mm diameter mandrel. Each of the three tested fibers experience an absolute delta attenuation value of less than 0.4 db at 1550 nm under up to three wraps about the 10 mm diameter mandrel. Each of the three tested fibers experience an absolute delta attenuation value of less than 0.3 db at 1550 nm under up to four wraps about the 10 mm diameter mandrel. Each of the three tested fibers experience an absolute delta attenuation value of less than 0.2 db at 1550 nm under up to two wraps about the 10 mm mandrel. Each of the three tested fibers experience an absolute delta attenuation value of less than 0.1 db at 1550 nm under up to one wrap about the 10 mm mandrel.

Table 3 describe attenuation data for cable assembly 600 if FIG. 11 using ClearCurve™ single mode fiber in the subunit cables 300, in a corner bend test under various loads, at 1550 nanometers.

TABLE 3

Corner Bend Delta Attenuation at 1550 nanometers

| Color | Wgt. (kg) | delta attenuation (dB) |
|---|---|---|
| Aqua | 2 | 0.01 |
| Aqua | 6 | 0.06 |
| Aqua | 10 | 0.14 |
| Aqua | 14 | 0.25 |
| Rose | 2 | 0.03 |
| Rose | 6 | 0.14 |
| Rose | 10 | 0.56 |
| Rose | 14 | 0.61 |
| Yellow | 2 | 0.04 |
| Yellow | 6 | 0.18 |
| Yellow | 10 | 0.21 |
| Yellow | 14 | 0.18 |

As shown in Table 3, each of the three tested fibers of the cable assembly 600 experiences an absolute delta attenuation value of less than 0.6 dB under a load of 10 kilograms at 1550 nm in the corner bend test. Each of the three tested fibers experiences a delta attenuation value of less than 0.3 under a load of 6 kilograms in the corner bend test. Each of the three tested fibers experiences a delta attenuation value of less than 0.1 under a load of two kilograms in the corner bend test.

According to one aspect of the present invention, the subunit cables of the fiber optic assemblies can be colored according to industry standard code. The fiber optic assemblies could be placed in a corner molding raceway and single fiber subunit cables can be dropped at each apartment of a MDU. Each individual cable can also have a unique print identifier to facilitate connection to the correct FDT port. For example, at a first living unit of an MDU, the technician can access the subunit cable 300 with "CONN 1" printed thereon. The second living unit can receive the white subunit cable 300 with "CONN 2" printed thereon, and so on through the sixth subunit labeled "CONN 6." The direction of the print can be used to facilitate error-free installation, and can be arranged to as to always point away from (or toward) the FDT. This enables the technician to cut the subunit cable and reliably drop to the proper location. This is an important feature because the technician must typically cut the subunit cable at a point at least six feet past the point where the terminated drop is to be placed. SZ stranding provides ease of access to subunit cables at midspan locations of the fiber optic assemblies. Dual six fiber color coding (e.g. blue through white and black through aqua) can be used in twelve-fiber embodiments to provide two paths exiting the connection closet in MDUs. The lower color fibers (e.g. blue through white), for example, can be routed to lower numbered apartments in one direction and higher color fibers (e.g. black through aqua) can be routed in the opposite direction. Splitting groups of six fibers in this manner reduces the amount of cable needed per floor.

According to the above-described embodiments, the low bend diameter and small cross-sectional area in part allow the fiber optic assemblies to be bent around corners and otherwise introduced into tight spaces or through apertures, while maintaining acceptable attenuation loss performance. The fiber optic assemblies are therefore particularly suited for providing fiber optic service indoors to structures such as multiple dwelling units (MDU).

The illustrated embodiments show fiber optic cable assemblies having a plurality of single fiber subunit cables. Subunit fiber optic cables having more than one optical fiber, such as two, three or more optical fibers, may also be used in fiber optic cable assembly embodiments constructed according to the principles of the present invention. Further, varying numbers of subunit cables, such as eight, twenty-four, etc., can be arranged into a fiber optic cable assembly according to the present invention.

Many modifications and other embodiments within the scope of the claims will be apparent to those skilled in the art. For instance, the concepts of the present invention can be used with any suitable fiber optic cable design and/or method of manufacture. For instance, the embodiments shown can include other suitable cable components such as an armor layer, coupling elements, different cross-sectional shapes, or the like. Thus, it is intended that this invention covers these modifications and embodiments as well those also apparent to those skilled in the art.

What is claimed is:

1. A fiber optic assembly particularly suited for providing fiber optic service indoors, comprising:
a bundle of subunit fiber optic cables, wherein the bundle of subunit fiber optic cables comprises at least six subunit fiber optic cables, wherein each of the at least six subunit fiber optic cables comprises:
an optical fiber supported by the subunit fiber optic cable, wherein the optical fiber is bend-insensitive such that the optical fiber experiences an absolute delta attenuation value of less than 0.2 dB at 1550 nanometers wavelength under up to five wraps about a 15 mm diameter mandrel and experiences an absolute delta attenuation value of less than 0.5 dB at 1550 nanometers wavelength under up to five wraps about a 10 mm diameter mandrel, whereby the optical fiber is configured to be bent around tight corners without excessive attenuation losses and, in use, the subunit fiber optic cables can be separated from the fiber optical assembly and run to separate locations, and the use of bend-insensitive optical fiber further allows the subunit cables to be run through tight locations and along tortuous paths;
an integral, individual strength component, wherein the strength component comprises a layer of flexible, loose tensile strength members, wherein the layer of loose tensile strength members reinforces the optical fiber, whereby the fiber optic assembly incorporating the subunit fiber optic cables has high tensile strength, while not being excessively rigid or inflexible; and
a subunit jacket surrounding the layer of loose tensile strength members, wherein the subunit jackets comprise polyvinyl chloride, wherein the subunit fiber optic cables are flame retardant cables and include additives to improve flame resistance, whereby the subunit fiber optic cables have flame retardant properties to achieve desired flame ratings for the fiber optic assembly; and
binders comprising elongate tensile yarns and stranded about the subunit fiber optic cables, wherein the binders are made from high tensile strength materials to thereby enhance the tensile strength of the fiber optic assembly, wherein the elongate tensile yarns of the binders comprise at least one of aramid, fiberglass, and polyester; the binders comprising a pair of the external binders that are oppositely helically wound about an external periphery of the bundle of subunit fiber optic cables, wherein the external binders are free of an outer jacket, whereby the omission of the outer jacket in part gives the fiber optic assembly a small cross-section, and, more specifically, wherein an average diameter of the fiber optic assembly is less than 12.5 mm.

2. The fiber optic assembly of claim 1, wherein the average diameter of the fiber optic assembly is less than 11.5 mm.

3. The fiber optic assembly of claim 2, wherein the fiber optic assembly is free of glass-reinforced plastic strength members, whereby omission of glass-reinforced plastic strength members, including a central strength component, in part gives the fiber optic assembly an extremely small bending radius.

4. The fiber optic assembly of claim 3, wherein a bend diameter of the fiber optic assembly is less than one-half inch (12.7 mm).

5. The fiber optic assembly of claim 1, wherein a diameter of the subunit fiber optic cables is about 1.65 mm.

6. The fiber optic assembly of claim 5, wherein the tensile strength members comprise aramid yarn in an arrangement such that a tensile strength of the subunit fiber optic cables is at least 40 lbs.

7. The fiber optic assembly of claim 6, each subunit fiber optic cable has a tensile limit of at least 50 lbs.

8. The fiber optic assembly of claim 7, wherein the elongate tensile yarns of the binders are polyester.

9. The fiber optic assembly of claim 8, wherein the tensile limit for the fiber optic assembly is at least 300 lbs.

10. The fiber optic assembly of claim 1, wherein the subunit cables have a lay length, and a lay length of the helically-wrapped external binders is less than the lay length of the subunit cables.

11. A fiber optic assembly particularly suited for providing fiber optic service indoors, comprising:

subunit fiber optic cables bundled together and each comprising:

an optical fiber supported by the subunit fiber optic cable, wherein the optical fiber is bend-insensitive such that the optical fiber experiences an absolute delta attenuation value of less than 0.2 dB at 1550 nanometers wavelength under up to five wraps about a 15 mm diameter mandrel and experiences an absolute delta attenuation value of less than 0.5 dB at 1550 nanometers wavelength under up to five wraps about a 10 mm diameter mandrel, whereby the optical fiber is configured to be bent around tight corners without excessive attenuation losses and, in use, the subunit fiber optic cables can be separated from the fiber optical assembly and run to separate locations, and the use of bend-insensitive optical fiber further allows the subunit cables to be run through tight locations and along tortuous paths;

an integral, individual strength component, wherein the strength component comprises a layer of flexible, loose tensile strength members, wherein the layer of loose tensile strength members reinforces the optical fiber, whereby the fiber optic assembly incorporating the subunit fiber optic cables has high tensile strength, while not being excessively rigid or inflexible, and wherein the tensile strength members comprise aramid yarn; and a subunit jacket surrounding the layer of loose tensile strength members, wherein the subunit fiber optic cables are flame retardant cables and include additives to improve flame resistance, whereby the subunit fiber optic cables have flame retardant properties to achieve desired flame ratings for the fiber optic assembly; and binders comprising elongate tensile yarns and stranded about the subunit fiber optic cables, wherein the binders are made from high tensile strength materials to thereby enhance the tensile strength of the fiber optic assembly; the binders comprising external binders that are helically wound about an external periphery of the bundle of subunit fiber optic cables, wherein the external binders are free of an outer jacket, whereby the omission of the outer jacket in part gives the fiber optic assembly a small cross-section; and wherein the fiber optic assembly is free of glass-reinforced plastic strength members, whereby omission of glass-reinforced plastic strength members, including a central strength component, in part gives the fiber optic assembly an extremely small bending radius.

12. The fiber optic assembly of claim 11, wherein a bend diameter of the fiber optic assembly is less than one-half inch (12.7 mm).

13. The fiber optic assembly of claim 11, wherein the average diameter of the fiber optic assembly is less than 11.5 mm.

14. The fiber optic assembly of claim 11, wherein a diameter of the subunit fiber optic cables is about 1.65 mm.

15. The fiber optic assembly of claim 11, wherein the aramid yarn is arranged such that a tensile strength of the subunit fiber optic cables is at least 40 lbs.

16. The fiber optic assembly of claim 15, each subunit fiber optic cable has a tensile limit of at least 50 lbs.

17. The fiber optic assembly of claim 16 wherein the elongate tensile yarns of the binders are polyester.

18. The fiber optic assembly of claim 17, wherein the tensile limit for the fiber optic assembly is in the range of 300 lbs to 600 lbs.

19. The fiber optic assembly of claim 11, wherein the subunit cables have a lay length, and a lay length of the helically-wrapped external binders is less than the lay length of the subunit cables.

20. A fiber optic assembly particularly suited for providing fiber optic service indoors, comprising:

a bundle of subunit fiber optic cables, wherein the bundle of subunit fiber optic cables comprises at least six subunit fiber optic cables, wherein each of the at least six subunit fiber optic cables comprises:

an optical fiber supported by the subunit fiber optic cable, wherein the optical fiber is bend-insensitive such that the optical fiber experiences an absolute delta attenuation value of less than 0.2 dB at 1550 nanometers wavelength under up to five wraps about a 15 mm diameter mandrel and experiences an absolute delta attenuation value of less than 0.5 dB at 1550 nanometers wavelength under up to five wraps about a 10 mm diameter mandrel, whereby the optical fiber is configured to be bent around tight corners without excessive attenuation losses and, in use, the subunit fiber optic cables can be separated from the fiber optical assembly and run to separate locations, and the use of bend-insensitive optical fiber further allows the subunit cables to be run through tight locations and along tortuous paths;

an integral, individual strength component, wherein the strength component comprises a layer of flexible, loose tensile strength members, wherein the layer of loose tensile strength members reinforces the optical fiber, whereby the fiber optic assembly incorporating the subunit fiber optic cables has high tensile strength, while not being excessively rigid or inflexible; and a subunit jacket surrounding the layer of loose tensile strength members, wherein the subunit jackets comprise polyvinyl chloride, wherein the subunit fiber optic cables are flame retardant cables and include additives to improve flame resistance, whereby the subunit fiber optic cables have flame retardant properties to achieve desired flame ratings for the fiber optic assembly; and binders comprising elongate tensile yarns and stranded about the subunit fiber optic cables, wherein the binders are made from high tensile strength materials to thereby enhance the tensile strength of the fiber optic assembly, wherein the elongate tensile yarns of the binders comprise at least one of aramid, fiberglass, and polyester; the binders comprising a pair of the external binders that are oppositely helically wound about an external periphery of the bundle of subunit fiber optic cables, wherein the subunit cables have a lay length, and a lay length of the helically-wrapped external binders is less than the lay length of the subunit cables, wherein the external binders are free of an outer jacket, whereby the omission of the outer jacket in part gives the fiber optic assembly a small cross-section; and wherein the fiber optic assembly is free of glass-reinforced plastic strength members, whereby omission of glass-reinforced plastic strength members, including a central strength component, in part gives the fiber optic assembly an extremely small bending radius.

* * * * *